United States Patent [19]
Yukawa et al.

[11] Patent Number: 5,424,369
[45] Date of Patent: * Jun. 13, 1995

[54] SELF-CROSSLINKING RESIN

[75] Inventors: Yoshiyuki Yukawa, Hiratsuka; Motoshi Yabuta, Hadano; Yasushi Nakao, Hiratsuka, all of Japan

[73] Assignee: Kansai Paint Company, Limited, Amagasaki, Japan

[*] Notice: The portion of the term of this patent subsequent to May 26, 2009 has been disclaimed.

[21] Appl. No.: 899,984

[22] Filed: Jun. 17, 1992

[30] Foreign Application Priority Data

Jun. 20, 1991 [JP] Japan .................... 3-148889

[51] Int. Cl.$^6$ .................... C08F 265/06; C08F 271/00
[52] U.S. Cl. .................... 525/303; 525/286; 525/296; 525/308; 525/309
[58] Field of Search ............ 525/296, 303, 309, 286, 525/308, 293

[56] References Cited

U.S. PATENT DOCUMENTS

| | | | |
|---|---|---|---|
| 4,683,173 | 7/1987 | Abbey . | |
| 4,692,503 | 9/1987 | Das et al. . | |
| 5,116,930 | 5/1992 | Yabuta et al. | 528/45 |
| 5,124,399 | 6/1992 | Yabuta et al. | 524/555 |
| 5,173,533 | 12/1992 | Yabuta et al. | 524/523 |
| 5,274,045 | 12/1993 | Yukawa et al. | 525/293 |

FOREIGN PATENT DOCUMENTS

| | | |
|---|---|---|
| 0108630 | 5/1984 | European Pat. Off. . |
| 0250633 | 1/1988 | European Pat. Off. . |
| 0326984 | 9/1989 | European Pat. Off. . |

*Primary Examiner*—Vasu S. Jagannathan
*Attorney, Agent, or Firm*—Armstrong, Westerman, Hattori, McLeland & Naughton

[57] ABSTRACT

A self-crosslinking resin comprising a resin containing a blocked isocyanate group, and a resin containing a hydroxyl group, and a tertiary amino group and/or a quaternary ammonium group and attached to the resin by a urethane bond.

The self-crosslinking resins are useful for adhesive compositions and coating compositions of the aqueous type.

8 Claims, No Drawings

SELF-CROSSLINKING RESIN

The present invention relates to novel self-crosslinking resins having within the molecule a blocked isocyanate group and a hydroxyl group which are reactive groups complementary to each other. The resins are useful especially for adhesive compositions and coating compositions of the aqueous type.

Two-pack or single-pack coating compositions wherein an acryl polyol or like hydroxyl-containing polymer is cured with an isocyanate crosslinking agent produce cured coatings which are excellent in chemical resistance, physical properties, weather resistance, etc. and are therefore in wide use, for example, as motor vehicle coating compositions.

However, the two-pack composition has problems as to safety and hygiene when the isocyanate crosslinking agent is admixed with the other component or when the composition is applied, and further has the drawback that the coating preparation obtained by mixing the two components together has a short pot life before application, becomes viscous during coating operations and presents difficulty in cleaning the coating device. The single-pack composition has the drawback of being not always satisfactory in the compatibility of the crosslinking agent, i.e., blocked isocyanate, with the acryl polyol serving as the base resin, such that even if they are compatible, the cured coating formed differs in composition between the surface and the interior when observed microscopically and is low in curability, gloss and surface smoothness.

To overcome these drawbacks, Unexamined Japanese Patent Publication No. 186722/1988 discloses a self-crosslinking resin which is prepared by copolymerizing a polymerizable monomer containing an isocyanate group or such a monomer as blocked with a polymerizable monomer containing a hydroxyl group to introduce the complementary reactive groups into the molecule.

Nevertheless, preparation of the disclosed resin involves problems. When a radically polymerizable monomer containing an unblocked isocyanate group is copolymerized with a hydroxyl-containing radically polymerizable monomer as disclosed in the publication, it is difficult to prevent the reaction between the isocyanate group and the hydroxyl group even if the copolymerization reaction is conducted at the lowest possible temperature, with the result that gelation is liable to occur during the reaction. The polymerization reaction has other problems with respect to initiators. Since the isocyanate-containing monomer is a derivative of $\alpha$-methylstyrene according to the publication, azo polymerization initiators fail to achieve a sufficient polymerization conversion, whereas peroxide or carbonate initiators, if used, require a temperature of at least 100° C. for the polymerization when a high conversion of polymerization is to be attained.

On the other hand, gelation is less likely to occur during the polymerization reaction when blocked isocyanate-containing polymerizable monomers are used. However, especially when the polymerizable monomer used contains an isocyanate group blocked with a phenol or oxime blocking agent, there arises a need to conduct the reaction at a relatively high temperature (120° to 140° C.), which entails the drawback of seriously coloring the product. If other blocking agents are used, a higher dissociation temperature will result, so that the self-crosslinkable resin obtained requires heating at a high temperature (at least 170° C.) for curing. When heated at a low temperature (e.g. up to 120° C.), the resin will not always be cured satisfactorily.

As is well known, aqueous coating compositions have increasing importance from the viewpoint of air pollution control and savings in resources. However, water-soluble melamine resins, which are still chiefly used as crosslinking agents for aqueous coating compositions, have problems in curing properties and chemical resistance. Conventional blocked isocyanate crosslinking agents are difficult to use in aqueous compositions because they require high-temperature heating and produce seriously colored coatings as described above.

An object of the present invention is to provide a novel self-crosslinking resin which is free of the problems of the prior art described.

Another object of the invention is to provide a self-crosslinking resin of the cationic type which has a blocked isocyanate group and a hydroxyl group in the molecule and is highly resistant to chemicals, curable even at low temperatures and especially useful for aqueous compositions and which can be prepared free of gelation and coloration without entailing a reduced conversion of polymerization.

These and other objects of the invention will become apparent from the following description.

The present invention provides a self-crosslinking resin characterized in that the resin comprises a resin containing a blocked isocyanate group, and a resin containing a hydroxyl group, and a tertiary amino group and/or a quaternary ammonuium group and attached to the resin by a urethane bond.

The resin of the invention is self-crosslinkable owing to the presence of both blocked isocyanate and hydroxyl, i.e., complementary reactive groups, in the molecule, and further has a tertiary amino group and/or a quaternary ammonium group and can therefore be readily made into an aqueous composition. The self-crosslinking resin can be made curable at low temperatures.

The self-crosslinking resin of the present invention can be prepared preferably by one of the processes (A) to (D) to be described later, using a vinyl polymer consisting essentially of an isocyanate-containing vinyl monomer (hereinafter referred to as the "NCO-containing monomer"), further comprising, when required, other vinyl monomer polymerized with the monomer, and having at least two isocyanate groups in the molocule. (The isocyanate-containing vinyl polymer will hereinafter be referred to as the "NCO-containing polymer.")

The NCO-containing monomer is a compound having at least one unblocked isocyante group and at least one radically polymerizable double bond in the molecule. Examples of such compounds are methacryloyl isocyanate, 2-isocyanate ethyl methacrylate, m- or p-isopropenyl-$\alpha,\alpha'$-dimethylbenzyl isocyanate and addition products of a hydroxyl-containing vinyl monomer with a diisocyanate compound in the mole ratio of 1:1. One or at least two of these compounds are usable.

The hydroxyl-containing vinyl monomer for use in preparing the NCO-containing monomer is a compound having at least one hydroxyl group and at least one radically polymerizable double bond in the molecule. Examples of such compounds are 2-hydroxyethyl (meth)acrylate, hydroxypropyl (meth)acrylate, hydroxybutyl acrylate, 2,3-dihydroxypropyl acrylate, 2- hydroxy-3-phenoxyethyl acrylate, 2-hydroxy-3-ethoxyethyl acrylate and the like. Also usable is an equimolar adduct of acrylic acid or methacrylic acid with a glycol (having 2 to 20 carbon atoms).

The diisocyanate compound to be used for preparing the NCO-containing monomer is a compound having two isocyanate groups in the molecules. Examples of such compounds are aromatic, alicyclic and aliphatic diisocyanate compounds including tolylene diisocyanate, 4,4'-diphenylmethane diisocyanate, xylylene diisocyanate, hexamethylene diisocyanate, lysine diisocyanate, 4,4'-methylenebis(cyclohexyl isocyanate), methylcyclohexane-2,4(2,6)-diisocyanate, isophorone diisocyanate and trimethylhexane diisocyanate.

Especially preferable among the above NCO-containing monomers are 2-isocyanate ethyl methacrylate, m-isopropenyl-α,α'-dimethylbenzyl isocyanate and equimolar adduct of 2-hydroxyethyl acrylate with isophorone diisocyanate.

The NCO-containing polymer is obtained by polymerizing such an NCO-containing monomer only, or copolymerizing the monomer with other vinyl monomer.

The other vinyl monomer is preferably a compound having a radically polymerizable double bond in the molecule but not having active hydrogen reactive with the isocyanate group. Examples of such compounds are styrene, α-methylstyrene, vinyltoluene and like aromatic vinyl monomers; methyl (meth)acrylate, ethyl (meth)acrylate, butyl (meth)acrylate, 2-ethylhexyl (meth)acrylate, lauryl (meth)acrylate, tridecyl (meth)acrylate, stearyl (meth)acrylate, cyclohexyl (meth)acrylate, benzyl (meth)acrylate and like (meth)acrylic acid esters; VISCOSE-3F, -3MF, -8F and -8MF (all brand names for products of OSAKA ORGANIC CHEMICAL INDUSTRY LTD.), perfluorocyclohexyl (meth)acrylate, N-2-propylperfluorooctanesulfonic acid amide ethyl (meth)acrylate, vinyl fluoride, vinylidene fluoride and like fluorine-containing vinyl monomers; N,N'-dimethylaminoethyl (meth)acrylate, N,N'-diethylaminoethyl (meth)acrylate, N,N'-dibutylaminoethyl (meth)acrylate, N,N'-dimethylaminopropyl (meth)acrylamide and like nitrogen-containing vinyl monomers; vinyl ethyl ether, vinyl butyl ether and like vinyl ether monomers; and glycidyl (meth)acrylate, 3,4-epoxycyclohexylmethyl (meth)acrylate, arylglycidyl ether, alkyletherified methylolacrylamide, (meth)acrylamide, (meth)acrylic acid chloride, vinyl chloride, vinylidene chloride, (meth)acrylonitrile, γ-methacryloxyalkyltrimethoxysilane, etc. These compounds are used singly, or at least two of them are used in admixture.

The ratio of NCO-containing monomer/other vinyl monomer (by weight) is suitably 100/0 to 1/99, preferably 70/30 to 10/90, although not limited specifically insofar as the NCO-containing polymer has at least two free isocyanate groups in the molecule.

The reaction to polymerize the NCO-containing monomer only or the NCO-containing monomer and other vinyl monomer in mixture is conducted preferably in an inert organic solvent free from active hydrogen. The organic solvent free from active hydrogen means a solvent free from active hydrogen which is reactive with the isocyanate group. Examples of useful solvents are hexane, heptane, octane and like aliphatic hydrocarbons, benzene, toluene, xylene and like aromatic hydrocarbons, ester solvents and ketone solvents, which are used singly or in admixture.

When the self-crosslinking resin of the invention is to be used for providing aqueous coating or adhesive compositions, the organic solvent for use in the polymerization is preferably a hydrophilic or water-soluble solvent free from active hydrogen. Examples of such solvents are diethylene glycol dimethyl ether, ethylene glycol dimethyl ether, N-methyl-2-pyrrolidone, dimethylformamide, methyl cellosolve acetate and the like. These hydrophilic solvents generally contain water, so that it is desirable to treat the solvent for dehydration or to apply a dehydrating agent to the solvent before use. When such a solvent is used for the polymerization, the self-crosslinking resin obtained can be diluted as it is with water.

Even if a water-insoluble organic solvent is used for polymerization, on the other hand, an aqueous composition can be prepared from the resulting reaction mixture by removing the solvent from the mixture or concentrating the mixture in a vacuum or spray-drying the mixture to obtain a powder, and dissolving or dispersing the concentrate or powder in water or in a mixture of water and a hydrophilic solvent. Alternatively an aqueous composition can be obtained by converting the mixture to an aqueous liquid as by an azeotropic method.

Examples of water-insoluble organic solvents usable in this case are hexane, heptane, octane, cyclohexane, benzene, toluene, xylene, methyl ethyl ketone, methyl butyl ketone, methyl isobutyl ketone, methyl amyl ketone, diethyl ketone, ethyl butyl ketone, ethyl acetate, butyl acetate, isobutyl acetate, amyl acetate, cellosolve acetate, carbitol acetate, etc.

Although the above-mentioned solvent having no active hydrogen is used in the step of polymerizing the NCO-containing monomer, solvents having active hydrogen are usable in an intermediate step and the subsequent steps of the process for preparing the present resin, i.e., in a system wherein no free NCO group is present. Examples of such solvents having active hydrogen are cellosolve, butyl cellosolve, propylene glycol monomethyl ether, methyl cellosolve, methanol, ethanol, propanol, butanol, etc. These solvents are highly soluble in water and readily usable.

The polymerization reaction is conducted usually at a temperature of 50° to 180° C. in the presence of a radical polymerization initiator. The molecular weight of the polymer to be obtained is adjustable, for example, by varying the concentration of the reaction system or the amount of initiator. The concentration of the reaction system is in the range of 20 to 80 wt. % calculated as the polymer.

Examples of useful radical polymerization initiators are benzoyl peroxide, lauroyl peroxide, caproyl peroxide, tert-butyl peroctoate, diacetyl peroxide and like organic peroxides; azobisisobutyronitrile, azobis-2,4-dimethylvaleronitrile, dimethyl-2,2'-azoisobutyrate and like azo catalysts; diisopropylperoxy carbonate, tert-butyl peroxy isopropyl carbonate and like carbonate; and redox initiators. The concentration of the initiator, although variable over the range of 0.01 to 15 wt. % based on the whole amount of monomer(s), is preferably in the range of 0.1 to 10 wt. %.

For polymerization, an electron beam, ultraviolet rays, etc. are usable instead of the initiator.

Besides radical polymerization, ion polymerization or group transfer polymerization can be resorted to.

In the case where m-isopropenyl-α,α'-dimethylbenzyl isocyanate is used as the NCO-containing monomer for polymerization, it is desired to conduct the reaction at a temperature of at least 100° C. using a peroxide or carbonate initiator so as to achieve a higher polymerization conversion. It is more desirable to use the isocyanate in combination with an acrylate vinyl monomer, whereby a polymer of higher polymerization conversion can be obtained easily.

The NCO-containing polymer thus prepared for use in the present invention is about 500 to about 50000, preferably 1000 to 30000, in weight average molecular weight.

The NCO-containing polymer, which has at least two free isocyanate groups in the molecule, is preferably free from any active hydrogen. The polymer is preferably 10 to 200 g/1000 g resin, more preferably 20 to 150 g/1000 g resin, in isocyanate value.

The self-crosslinking resin of the present invention can be prepared from the NCO-containing polymer favorably, for example, by one of the following process A, process B, process C and process D, wherein polymerization is effected without entailing gelation, coloration or a reduction in polymerization conversion during the reaction.

Process A: A process comprising reacting a hydroxyl-containing vinyl monomer with some of the isocyanate groups in the skeleton of the NCO-containing polymer to introduce a polymerizable double bond into the skeleton, then completely blocking the isocyanate groups remaining in the polymer skeleton with a blocking agent, and thereafter polymerizing an unsaturated monomer component (1) consisting essentially of a hydroxyl-containing vinyl monomer and a vinyl monomer containing a tertiary amino group and/or a quaternary ammonium group with the introduced polymerizable double bond.

Process B: A process comprising blocking some of the isocyanate groups in the skeleton of the NCO-containing polymer with a blocking agent, then reacting a hydroxyl-containing vinyl monomer with the isocyanate groups remaining in the polymer skeleton to introduce a polymerizable double bond into the skeleton, and thereafter polymerizing an unsaturated monomer component (1) consisting essentially of a hydroxyl-containing vinyl monomer and a vinyl monomer containing a tertiary amino group and/or a quaternary ammonium group with the introduced polymerizable double bond.

Process C: A process comprising reacting a hydroxyl-containing vinyl monomer with some of the isocyanate groups in the skeleton of the NCO-containing polymer to introduce a polymerizable double bond into the skeleton, then completely blocking the isocyanate groups remaining in the polymer skeleton with a blocking agent, thereafter polymerizing an unsaturated monomer component (2) consisting essentially of a hydroxyl-containing vinyl monomer and a vinyl monomer containing a glycidyl group with the introduced polymerizable double bond, and subsequently reacting a secondary amine with the glycidyl group to introduce a tertiary amino group into the resulting polymer.

Process D: A process comprising blocking some of the isocyanate groups in the skeleton of the NCO-containing polymer with a blocking agent, then reacting a hydroxyl-containing vinyl monomer with the isocyanate groups remaining in the polymer skeleton to introduce a polymerizable double bond into the skeleton, thereafter polymerizing an unsaturated monomer component (2) consisting essentially of a hydroxyl-containing vinyl monomer and a vinyl monomer containing a glycidyl group with the introduced polymerizable double bond, and subsequently reacting a secondary amine with the glycidyl group to introduce a tertiary amino group into the resulting polymer.

The hydroxyl-containing vinyl monomer to be reacted with the NCO-containing polymer in the foregoing processes A to D is preferably one of those exemplified for preparing the NCO-containing monomer.

The reaction between the NCO-containing polymer and the hydroxyl-containing vinyl monomer in the processes A and C is the urethanation reaction between the isocyanate group and the hydroxyl group. More specifically, the urethanation reaction is conducted by admixing the hydroxyl-containing vinyl monomer with an organic solution of the NCO-containing polymer and heating the mixture usually at a temperature of 40° to 100 ° C. When required, tin compound or like catalyst may be used for this reaction. The amount of the hydroxyl-containing vinyl monomer to be admixed with the polymer is such that the NCO-containing polymer, which is about 500 to about 50000 in weight average molecular weight, is given at least 0.1 polymerizable double bond per molecule. The number of polymerizable double bonds to be introduced into the polymer is preferably 0.5 to 1.5, most preferably 1, per molecule when the polymer has a weight average molecular weight of about 1000 to 30000.

Next in the processes A and C, the free isocyanate groups remaining in the NCO-containing polymer which has the polymerizable double bond introduced thereinto through the reaction with the hydroxyl-containing vinyl monomer as stated above are completely blocked by reacting a blocking agent with the remaining isocyanate groups. Examples of useful blocking agents are phenol, cresol, xylenol, p-ethylphenol, o-isopropylphenol, p-tert-butylphenol, p-tert-octylphenol, thymol, p-naphthol, P-nitrophenol, p-chlorophenol and like phenols; methanol, ethanol, propanol, butanol, ethylene glycol, methyl cellosolve, butyl cellosolve, methyl carbitol, benzyl alcohol, phenyl cellosolve, furfuryl alcohol, cyclohexanol and like alcohols; dimethyl malonate, ethyl acetoacetate and like active methylene compounds; butyl mercaptan, thiophenol, tertdodecyl mercaptan and like mercaptans; acetanilide, acetanisidide, acetamide, benzamide and like acid amides; succinimide, maleimide and like imides; diphenylamine, phenylnaphthylamine, aniline, carbazole and like amines; imidazole, 2-ethylimidazole, and like imidazoles; urea, thiourea, ethyleneurea and like ureas; phenyl N-phenylcarbamate, 2-oxazolidone and like carbamic acid salts; ethyleneimine and like imines; formaldoxime, acetaldoxime, methyl ethyl ketoxime, methyl isobutyl ketoxime, cyclohexanoneoxime and like oximes; sodium bisulfite, potassium bisulfite and like sulfites; $\epsilon$-caprolactam, $\delta$-valerolactam, $\gamma$-butyrolactam, $\beta$-propiolactam and like lactams; etc. Especially preferable are phenol, lactam, alcohol and oxime blocking agents.

For the reaction of the blocking agent with the NCO-containing polymer, the blocking agent is admixed with an organic solution of the NCO-containing polymer, and the mixture is reacted usually at a temperature of 20° to 100° C. When required, a tin compound catalyst may be used.

As a rule, it is desired that in the processes A and C, the blocking agent be used in an amount required to react with all the free isocyanate groups remaining in the NCO-containing polymer having the polymerizable double bond introduced therein.

In the processes B and D, the blocking agent is admixed with the NCO-containing polymer in an amount required to allow free isocyanate groups to remain in the polymer in such an amount that the subsequent urethanation reaction of the hydroxyl-containing vinyl monomer will introduce generally the same amount of polymerizable double bonds into the polymer as in the process A. It is most desirable to use the blocking agent in an amount which is required to allow free isocyanate groups to remain in such an amount that one polymerizable double bond can be introduced into the NCO-containing polymer per molecule thereof and which is needed to completely block the other free isocyanate groups.

After the reaction of the blocking agent, the hydroxyl-containing vinyl monomer is reacted with all the remaining free isocyanate groups. This reaction in the processes B and D can be carried out in the same manner as in the process A.

The self-crosslinking resin to be produced by the processes A or B of the invention is obtained by polymerizing the aforementioned unsaturated monomer component (1) with the blocked isocyanate-containing polymer having the polymerizable double bond as dissolved in an organic solvent, i.e., with the double bond, the monomer component (1) consisting essentially of a hydroxyl-containing vinyl monomer and a vinyl monomer containing a tertiary amino group and/or a quaternary ammonium group. The resin comprises a blocked isocyanate-containing resin molecule and a resin molecule containing a hydroxyl group, and a tertiary amino group and/or a quaternary ammonium group attached to the former resin molecule by a urethane bond. In other words, the resin can be said to be a graft polymer of the two resin molecules.

Examples of organic solvents useful for the above polymerization are those containing active hydrogen, such as cellosolve, methyl cellosolve, butyl cellosolve, propylene glycol monomethyl ether, methanol, ethanol, propanol, isopropanol, butanol, benzyl alcohol and hexylene glycol. These solvents may be used singly, or at least two of them are usable in admixture.

The unsaturated monomer component (1) consists essentially of a hydroxyl-containing vinyl monomer and a vinyl monomer containing a tertiary amino group and/or a quaternary ammonium group. It is also possible to use carboxyl-containing vinyl monomers and/or other vinyl monomers when required. Among these vinyl monomers, examples of suitable hydroxyl-containing vinyl monomers and other vinyl monomers are those previously mentioned.

Examples of useful vinyl monomers containing a tertiary amino group are N,N'-dimethylaminoethyl acrylate, N,N'-dimethylaminoethyl methacrylate and like dialkylaminoalkyl (meth)acrylates; N,N'-dimethylaminopropyl(meth)acrylamide and like dialkylaminoalkyl(meth)acrylamides; reaction products of glycidyl acrylate, glycidyl methacrylate or like epoxy-containing vinyl monomer and a secondary amine; etc. Examples of secondary amines to be reacted with the epoxy group are diethylamine, dipropylamine, dibutylamine, methylbutylamine and the like.

The vinyl monomer containing a quaternary ammonium group is prepared usually by quaternizing a monomer containing a tertiary amino group. The tertiary amino-containing monomer is quaternized by reacting the monomer with an acid to thereby convert the tertiary amino group to a quaternary ammonium group.

Examples of useful acids are lactic acid, formic acid, acetic acid, propionic acid, butyric acid, valeric acid and like organic acids, hydrochloric acid, phosphoric acid, sulfuric acid, nitric acid and like inorganic acids.

As another method of incorporating a quaternary ammonium group, it is also useful to react such an acid with the self-crosslinking resin having a tertiary amino group introduced thereinto with a tertiary amino-containing vinyl monomer as stated above. The acid forms a salt with a quaternized nitrogen atom. Although the amount of acid to be used varies with the proportion of tertiary amino groups present in the resin, the acid is used generally in an amount sufficient to convert about 50 to about 100% of the tertiary amino groups. For example, water, hydrophilic organic solvents or other additives may be present in the system for quaternizing tertiary amino groups.

The carboxyl-containing vinyl monomer is a compound having at least one carboxyl group and at least one radically polymerizable unsaturated bond in the molecule. Examples of such compounds are acrylic acid, methacrylic acid, crotonic acid, maleic acid, maleic anhydride, itaconic acid, itaconic anhydride, fumaric acid, citraconic acid and like $\alpha,\beta$-ethylenically unsaturated carboxylic acids.

The proportion of vinyl monomers constituting the unsaturated monomer component (1), although not limited specifically, are preferably 1 to 90 wt. %, more preferably 10 to 60 wt. %, of the hydroxyl-containing vinyl monomer, preferably 0.5 to 50 wt. %, more preferably 1 to 30 wt. %, of the tertiary amino- or quaternary ammonium-containing vinyl monomer, preferably 0 to 5 wt. %, more preferably 0 to 3 wt. %, of the carboxyl-containing vinyl monomer, and preferably 0 to 99 wt. %, more preferably 20 to 80 wt. %, of the above-mentioned other vinyl monomer, based on the whole weight of the unsaturated monomer.

The self-crosslinking resin to be produced by the process C or D is obtained by reacting the above-mentioned unsaturated monomer component (2), which consists essentially of a hydroxyl-containing vinyl monomer and a glycidyl-containing vinyl monomer, with the blocked isocyanate-containing polymer having a polymerizable double bond as dissolved in an organic solvent, i.e., with the double bond, and subsequently reacting a secondary amine with the resulting polymer to introduce a tertiary amino group thereinto. The resin comprises a blocked isocyanate-containing resin molecule and a resin molecule containing a hydroxyl group and a tertiary amino group and attached to the former resin by a urethane bond. Therefore, the present resin can be said to be a graft polymer of the two resin molecules.

The unsaturated monomer component (2) for use in the process C or D consists essentially of a hydroxyl-containing vinyl monomer and a glycidyl-containing vinyl monomer. It is also possible to use carboxyl-containing vinyl monomers and/or other vinyl monomers when required. Examples of preferable hydroxyl-containing vinyl monomers, carboxyl-containing vinyl monomers and other vinyl monomers are those previously mentioned. The glycidyl vinyl monomer has at least one glycidyl group and at least one polymerizable double bond in the molecule. Examples of especially preferred such compounds are glycidyl acrylate, glycidyl methacrylate, methylglycidyl acrylate, methylglycidyl methacrylate, etc.

The proportions of vinyl monomers constituting the unsaturated vinyl monomer component (2), although not limited specifically, are preferably 1 to 90 wt. %, more preferably 5 to 60 wt. %, of the hydroxyl-containing vinyl monomer, preferably 0.5 to 50 wt. %, more preferably 1 to 30 wt. %, of the glycidyl-containing vinyl monomer, preferably 0 to 5 wt. % of the carboxyl-containing vinyl monomer, and preferably 0 to 99 wt. %, more preferably 20 to 80 wt. %, of the above-mentioned other vinyl monomer, based on the whole weight of the unsaturated monomer component (2).

In the processes A to D, the unsaturated monomer component (1) or (2) is polymerized with the blocked isocyanate-containing polymer having the polymerizable double bond usually in the presence of a radical polymerization initiator. Examples of radical polymerization initiators which can be used are benzoyl peroxide, lauroyl peroxide, caproyl peroxide, tert-butyl peroctoate, diacetyl peroxide and like organic peroxides; azobisisobutyronitrile, azobis-α,γ-dimethylvaleronitrile, dimethyl-α,α'-azoisobutyrate and like azo catalysts; diisopropylperoxy carbonate, tertbutylperoxyisopropyl carbonate and like carbonate catalysts; redox initiators; etc. The concentration of the polymerization initiator is variable over the range of 0.01 to 15 wt. % based on the combined amount of the vinyl monomers and is preferably in the range of 0.1 to 10 wt %.

It is suitable that the proportion of the unsaturated monomer component (1) or (2) to be polymerized with the blocked isocyanate-containing polymer having the polymerizable double bond be generally about 5 to about 500 parts by weight, preferably 10 to 350 parts by weight, per 100 parts by weight of the polymer although widely variable with the kind of resin to be obtained. The combined concentration of the polymer and the unsaturated monomer component (1) or (2) present in the organic solvent is generally suitably about 30 to about 80 wt. %, preferably 40 to 70 wt. %.

The polymerization can be effected by a known process. It is generally suitable that the polymerization temperature be in the range of about 50° to about 100° C., whereas if the reaction is conducted at a temperature higher than is needed, the blocking agent in the blocked isocyanate present in the polymer having the polymerizable double bond is likely to dissociate partly, permitting a reaction between the isocyanate and hydroxyl to make the reaction mixture more viscous or cause gelation. Preferably, therefore, the reaction is conducted at a temperature of up to 70° C.

After the unsaturated monomer component (2) has been polymerized with the blocked isocyanate-containing polymer having a polymerizable double bond in the process C or D, a secondary amine can be reacted with the glycidyl of the resulting copolymer at about 40° to about 100° C., preferably at about 60° to about 90° C., to obtain a copolymer containing a tertiary amino group. Examples secondary amines for use in the reaction with the glycidyl are diethylamine, dipropylamine, dibutylamine, methylbutylamine, etc.

The self-crosslinking resin thus prepared according to the invention comprises a resin having at least one blocked isocyanate group, and a resin having at least one hydroxyl group, and at least one tertiary amino group and/or at least one quaternary ammonium group and attached to the former resin by a urethane bond. The self-crosslinking resin is about 1000 to about 100000, preferably about 5000 to about 50000, in weight average molecular weight.

When required, the self-crosslinking resin of the invention can be made into an aqueous self-crosslinking resin composition by neutralizing the tertiary amino group with an acid, and dissolving or dispersing the resulting resin in water or a mixture of water and a hydrophilic organic liquid.

When thus made into an aqueous liquid by neutralization, the resin provides a cationic aqueous self-crosslinking resin. The neutralizing agent to be used is not limited specifically insofar as it is an acid. Examples of useful acids are organic acids such as lactic acid, formic acid, acetic acid, propionic acid, butyric acid and valeric acid, and inorganic acids such as hydrochloric acid, phosphoric acid, sulfuric acid and nitric acid.

Since the tertiary amino group chiefly undergoes the neutralization reaction, the resin need not always be neutralized when having quaternary ammonium groups only. When having quaternary ammonium groups, the resin is highly soluble or dispersible in water and therefore usually need not be neutralized with an acid.

The amount of acid to be used, which varies with the proportion of tertiary amino groups in the resin, is usually such as is sufficient to neutralize about 10 to about 100 mole % of the tertiary amino groups. For example, water, hydrophilic organic liquid, other additive or the like may be added to the resin to be neutralized, before or simultaneously with the addition of the agent.

After the neutralization, the resin is admixed with an aqueous liquid with stirring, or the aqueous liquid is admixed with the resin with stirring, whereby an aqueous composition having an optional resin solids content is prepared. The resin solids content of the aqueous composition, although not limited specifically, is generally preferably in the range of about 5 to about 90 wt. %.

The aqueous self-crosslinking composition thus obtained contains a resin having at least one blocked isocyanate group and at least one hydroxyl group, so that when the composition is heated, an isocyanate group is regenerated, which reacts with the hydroxyl group. The composition can therefore be provided as a single-pack composition which is self-crosslinkable.

When the self-crosslinking resin of the invention is adapted to have equal amounts of blocked isocyanate and hydroxyl in the molecule, the resin affords self-crosslinking coatings having the highest degree of crosslinking. However, when the resin is to be used for coating compositions or adhesive compositions, it is desired that one of the functional groups be present in excess, for example, in view of adhesion to substrates and adjoining layers. To be suitable, the resin is 20 to 250 in hydroxyl value (mg KOH/g resin) and 15 to 250 in isocyanate value (g/1000 g resin).

In preparing the NCO-containing polymer for use in the invention, the reaction system for polymerizing the NCO-containing monomer is free from any polymerizable monomer or organic solvent having active hydrogen which is reactive with isocyanate and therefore undergoes no gelation. According to the invention, the desired blocking agent can be reacted with the NCO-containing polymer at an optimum temperature required for the reaction of the agent with isocyanate groups, so that when the blocking agent used is, for example, of the phenol or oxime type which is susceptible to coloration at high temperatures, the agent need not be heated to a high temperature but is allowed to block the isocyanate groups at a temperature of not higher than about 100° C. This obviates any likelihood of coloration. Especially when low-temperature curability is required, the most desirable NCO-containing monomer to be used is m-isopropenyl-α,α'-dimethylbenzyl isocyanate (TMI) since the blocking agent dissociates at a low temperature (up to 100° C.). Further even if the blocking agent used has a high dissociation temperature, the agent readily reacts with the NCO-containing polymer free of any gelation.

The aqueous composition of the self-crosslinking resin containing both blocked isocyanate and hydroxyl and thus prepared is used, for example, as a coating composition or adhesive composition.

For use as the coating composition or the like, the present composition has further incorporated therein various pigments (including metallic pigments), fillers, surface conditioning agents, deterioration preventing agents, and is usable as a single-pack composition. When required, other compounds or agents can be further incorporated into the composition which include polyols, reactive diluents and other crosslinking agents (such as melamine resin, blocked polyisocyanates, and epoxy resin, acid compounds and alkoxysilane compounds). Various curing catalysts are also usable.

Examples of useful curing catalysts are tetraisopropyl titanate, tetrabutyl titanate, lithium acetate, iron(III) acetylacetonate, zinc 2-ethylhexonate, copper acetate, vanadium trichloride, tin octylate, dibutyltin diacetate, dibutyltin dioctoate, dibutyltin dilaurate, dibutyltin dimaleate and like metal catalysts. These metal catalysts may be used singly, or at least two of them are usable in admixture. Also preferably usable are tertiary amines such as trimethylamine, triethylamine, dimethylcyclohexylamine, N-tetramethylhexane-1,6-diamine, N-pentamethyldiethylenetriamine, 2-methyl-1,4-diazabicyclo [2,2,2] octane and the like. Especially desirable to use are organotin compounds such as tin octylate and dibutyltin dilaurate. The amount of curing catalyst to be used, although different depending on the kind thereof, is generally about 0.05 to about 5 wt. % based on the self-crosslinking resin (solids).

With the coating composition, adhesive composition or the like thus obtained, an isocyanate group is regenerated from the blocked isocyanate group when the composition is heated at 50° to 200° C., preferably 80° to 150° C., or owing to the presence of the curing catalyst, and the regenerated isocyanate group reacts with hydroxyl to form a urethane bond, giving a three-dimensional crosslinked structure.

Further when the present composition is to be used, for example, as an electrophoretic coating composition, a current is passed at about 100 to 300 V through an electrophoretic bath prepared from the composition for about 1 to about 10 minutes with the substrate to be coated placed in the bath and serving as a cathode, whereby the resin is deposited on the substrate. The coated substrate is then withdrawn from the bath, washed with water and thereafter baked at about 100° to 150° C. for 10 to 60 minutes, whereby an isocyanate group is regenerated from the blocked isocyanate group in the resin to react with hydroxyl, forming a urethane bond and giving a three-dimensionally crosslinked coating. Any substrate is useful insofar as it is electrically conductive. Especially preferable are those made of a metal such as iron, steel, aluminum or copper.

The resin of the present invention can be easily prepared as by polymerization without entailing gelation or coloration, can be made curable at low temperatures and gives cured coatings which are outstanding in resistance to chemicals, physical properties, weather resistance, etc.

The present invention will be described in greater detail with reference to the following examples, which nevertheless in no way limit the invention. The parts and percentages in Preparation Examples, Examples and Comparative Examples are all by weight as a rule.

EXAMPLE 1

Preparation of NCO-containing polymer

Methyl isobutyl ketone (35 parts) was placed into a reactor equipped with a stirrer, reflux condenser and thermometer and maintained at 110° C. with heating. A mixture of 23.1 parts of 2-isocyanate ethyl methacrylate, 20 parts of styrene, 35 parts of n-butyl methacrylate, 10 parts of methyl methacrylate, 11.9 parts of 2-ethylhexyl methacrylate and 2.5 parts of azobisisobutyronitrile was added dropwise to the methyl isobutyl ketone over a period of 3 hours.

Subsequently a mixture of 7.9 parts of methyl isobutyl ketone and 0.5 part of azobisisobutyronitrile was added dropwise to the resulting mixture over a period of 1 hour, followed by aging for 1 hour. (The reaction mixture obtained will be referred to as an "NCO-containing polymer solution a-1.")

The polymer solution obtained was transparent liquid having a solids content of 70%. The solution was 62.6 g/1000 g resin in isocyanate value, P in Gardner viscosity (25° C.) and about 9000 in weight average molecular weight.

Introduction of polymerizable double bond

The NCO-containing polymer solution a-1 (145.9 parts) was maintained at 80° C. by heating, 1.3 parts of 2-hydroxyethyl acrylate was added to the solution with stirring, and the mixture was aged for 1 hour and thereafter cooled to 40° C. Methyl ethyl ketoxime (12.6 parts) was added dropwise to the cooled mixture over a period of 30 minutes, followed by aging for 3 hours. The resulting mixture was diluted to a solids content of 70% with 5.95 parts of isopropanol. (The reaction mixture obtained will be referred to as a "solution a-2 of NCO-containing polymer with double bond.")

Preparation of self-crosslinking resin

Isopropanol (40 parts) was placed into a reactor equipped with a stirrer, reflux condenser and thermometer and maintained at 70° C. by heating. A mixture of 38 parts of methyl methacrylate, 10 parts of styrene, 10 parts of ethyl acrylate, 15 parts of 2-ethylhexyl methacrylate, 15 parts of 2-hydroxyethyl acrylate, 12 parts of N,N-dimethylaminopropylacrylamide, 123.1 parts of the solution a-2 of NCO-containing polymer with double bond (70% in solids content) and 4 parts of 2,2'-azobis(2,4-dimethylvaleronitrile) was added dropwise to the isopropanol over a period of 3 hours.

Subsequently, a mixture of 10 parts of butyl cellosolve and 0.5 part of 2,2'-azobis(2,4-dimethylvaleronitrile) was added dropwise to the mixture over a period of 1 hour, followed by aging for 1 hour. After the completion of reaction, the mixture was cooled to 40° C., and a mixture of 4.5 parts of acetic acid and 11.2 parts of isopropanol was added dropwise to the reaction mixture over a period of 1 hour at the same temperature, followed by a further reaction for 1 hour to obtain a self-crosslinking resin (graft polymer) of the invention. The resin solution obtained was substantially colorless and transparent and was found to be 1 by a Hellige colorimeter. To the solution was added 336.4 parts of deionized water to obtain an aqueous resin solution, which was 30% in solids content. The resin prepared was 38.9 mg KOH/g resin in hydroxyl value, about 18000 in weight average molecular weight and 24.9 g/1000 g resin in isocyanate value. (The reaction mixture will be referred to as a "self-crosslinking resin solution A".)

The resin solution A was 80% in gel fraction ratio (Note 1).

Note 1: Gel fraction ratio: The resin solution was applied to a tinplate to such a thickness that the coating would be 20 μm in thickness when cured, followed by heating at 160° C. for 30 minutes for curing. The coating prepared was separated off by the mercury amalgam method, placed into a container made of 300-mesh stainless steel net and subjected to extraction at the reflux temperature for 7 hours using a Soxhlet extractor and acetone/methanol (1:1) solvent. The gel fraction ratio was calculated from the following equation.

$$\text{Gel fraction ratio (\%)} = \frac{\text{Weight of coating after extraction}}{\text{Weight of coating before extraction}} \times 100$$

EXAMPLE 2

Preparation of NCO-containing polymer

Methyl isobutyl ketone (35 parts) was placed into a reactor equipped with a stirrer, reflux condenser and thermometer and maintained at 118° C. with heating. A mixture of 40 parts of m-isopropenyl-α,α'-dimethylbenzyl isocyanate, 15 parts of styrene, 35 parts of n-butyl acrylate, 10 parts of 2-ethylhexyl acrylate and 4 parts of tert-butylperoxyisopropyl carbonate was added dropwise to the methyl isobutyl ketone over a period of 3 hours. Subsequently, a mixture of 7.9 parts of methyl isobutyl ketone and 1.0 part of tert-butylperoxyisopropyl carbonate was added dropwise to the resulting mixture over a period of 1 hour, followed by aging for 1 hour. (The reaction mixture obtained will be referred to as an "NCO-containing polymer solution b-1.") The polymer solution obtained was a colorless transparent liquid having a solids content of 70%. The solution was 80.9 g/1000 g resin in isocyanate value, N in Gardner viscosity (25° C.) and about 10000 in weight average molecular weight.

Introduction of polymerizable double bond

To 147.9 parts of the NCO-containing polymer solution b-1 was added dropwise 16.8 parts of methyl ethyl ketoxime at 40° C. over a period of 30 minutes, the mixture was aged for 1 hours, and 1.2 parts of 2-hydroxyethyl acrylate was then added to the mixture with stirring while maintaining the mixture at 80° C., followed by aging for 3 hour. The resulting mixture was thereafter diluted with 7.1 parts of isopropanol to a solids content of 70%. (This reaction mixture will be referred to as a "solution b-2 of NCO-containing polymer with double bond.")

Preparation of self-crosslinking resin

Isopropanol (40 parts) was placed into a reactor equipped with a stirrer, reflux condenser and thermometer, and was maintained at 70° C. with heating. A mixture of 37 parts of methyl methacrylate, 23 parts of n-butyl acrylate, 10 parts of styrene, 5 parts of ethyl methacrylate, 10 parts of 2-hydroxyethyl methacrylate, 15 parts of N,N'-dimethylaminoethyl methacrylate, 79.2 parts of the 70% solution b-2 of NCO-containing polymer with double bond and 4 parts of 2,2'-azobis(2,4-dimethylvaleronitrile) was added dropwise to the isopropanol over a period of 3 hours. Subsequently, a mixture of 10 parts of butyl cellosolve and 0.5 part of 2,2'-azobis(2,4-dimethylvaleronitrile) was added dropwise to the resulting mixture over a period of 1 hour, followed by aging for 2 hour. After the completion of reaction, the reaction mixture was cooled to 40° C., and a mixture of 5.7 parts of acetic acid and 6.3 parts of isopropanol was added dropwise to the reaction mixture over a period of 1 hour at the same temperature, followed by a further reaction for 1 hour. The resin solution obtained was substantially colorless and transparent and was found to be 1 by a Hellige colorimeter. To the solution was added 277.1 parts of deionized water to obtain an aqueous resin solution. The resin prepared was 31.1 mg KOH/g resin in hydroxyl value, 24.5 g/1000 g resin in isocyanate value and about 20000 in weight average molecular weight. (The reaction mixture will be referred to as a "self-crosslinking resin solution B.")

The resin solution B was about 30% in solids content and 82% in gel fraction ratio (Note 1).

EXAMPLE 3

Preparation of NCO-containing polymer

Methyl isobutyl ketone (35 parts) was placed into a reactor equipped with a stirrer, reflux condenser and thermometer, and was maintained at 110° C. with heating. A mixture of 35 parts of equimolar adduct of isophorone diisocyanate and 2-hydroxyethyl acrylate, 15 parts of styrene, 35 parts of n-butyl methacrylate, 15 parts of 2-ethylhexyl methacrylate and 2.5 parts of azobisisobutyronitrile was added dropwise to the methyl isobutyl ketone over a period of 3 hours.

Subsequently, a mixture of 7.5 parts of methyl isobutyl ketone and 0.5 part of azobisisobutyronitrile was added dropwise to the resulting mixture over a period of 1 hour, followed by aging for 1 hour. (The reaction mixture obtained will be referred to as an "NCO-containing polymer solution c-1.")

The polymer solution obtained was a colorless transparent liquid having a solids content of 70%, and was N in Gardner viscosity (25° C.), 43.4 g/1000 g resin in isocyanate value and about 10000 in weight average molecular weight.

Introduction of polymerizable double bond

The NCO-containing polymer solution c-1 (145.5 parts) was maintained at 80° C. with heating, 1.2 parts of 2-hydroxyethyl methacrylate was added to the solution with stirring, and the mixture was aged for 1 hour and thereafter cooled to 40° C. Subsequently, 10.9 parts of methyl isobutyl ketoxime was added dropwise to the mixture over a period of 30 minutes, followed by aging for 3 hours. The reaction mixture was then diluted with 5.2 parts of isopropanol to a solids content of 70%. (This reaction mixture will be referred to as a "solution c-2 of NCO-containing polymer with double bond.")

Preparation of self-crosslinking resin

Isopropanol (40 parts) was placed into a reactor equipped with a stirrer, reflux condenser and thermometer, and was maintained at 70° C. with heating. A mixture of 22 parts of methyl methacrylate, 13 parts of n-butyl acrylate, 10 parts of styrene, 30 parts of ethyl methacrylate, 10 parts of 2-hydroxyethyl methacrylate, 15 parts of N,N-dimethylaminoethyl acrylate, 110.6 parts of the solution c-2 of NCO-containing polymer with double bond and 4 parts of 2,2'-azobis(2,4-dimethylvaleronitrile) was added dropwise to the isopropanol over a period of 3 hours. Subsequently, a mixture of 10 parts of butyl cellosolve and 0.5 part of 2,2'-azobis(2,4-dimethylvaleronitrile) was added dropwise to the resulting mixture over a period of 1 hour, followed by aging for 1 hour. After the completion of reaction, the reaction mixture was cooled to 40° C., and a mixture of 6.3 parts of acetic acid and 11.2 parts of isopropanol was added dropwise to the mixture over a period of 1 hour at the same temperature, followed by a further reaction for 1 hour. The resin solution obtained was substantially colorless and transparent and was found to be 1 by a Hellige colorimeter. To the solution was added 313.3 parts of deionized water to obtain an aqueous resin solution.

The resin prepared was 24.3 mg KOH/g resin in hydroxyl value, 16 g/1000 g resin in isocyanate value and about 20000 in weight average molecular weight. (The reaction mixture will be referred to as a "self-crosslinking resin solution C.")

The resin solution C was about 30% in solids content and 81% in gel fraction ratio (Note 1).

EXAMPLE 4

Preparation of NCO-containing polymer

Isopropanol (40 parts) was placed into a reactor equipped with a stirrer, reflux condenser and thermometer, and was maintained at 70° C. with heating. A mixture of 38 parts of methyl methacrylate, 10 parts of styrene, 10 parts of ethyl acrylate, 15 parts of 2-ethylhexyl methacrylate, 15 parts of 2-hyroxyethyl methacrylate, 12 parts of glycidyl acrylate, 123.1 parts of the 70% polymer solution a-2 and 4 parts of 2,2'-azobis(2,4-dimethylvaleronitrile) was added dropwise to the isopropanol over a period of 3 hours.

Subsequently, a mixture of 20 parts of butyl cellosolve and 0.5 part of 2,2'-azobis(2,4-dimethylvaleronitrile) was added dropwise to the resulting mixture over a period of 1 hour, followed by aging for 2 hour. With addition of 12 parts of dibutylamine, the reaction mixture was further reacted at 80° C. for 1 hour for the introduction of tertiary amino group. After the completion of reaction, the reaction mixture was cooled to 40° C. A mixture of 4.5 parts of acetic acid and 11.5 parts of isopropanol was added dropwise to the mixture at the same temperature over a period of 1 hour, followed by a further reaction for 1 hour to obtain a self-crosslinking resin (graft polymer) of the invention. The resin was substantially colorless and transparent and was found to be 1 by a Hellige colorimeter. Deionized water (361 parts) was added to the solution to obtain an aqueous resin solution.

The resin solution was 30% in solids content. The resin was 38.5 mg KOH/g resin in hydroxyl value, 24.9/1000 g resin in isocyanate value and about 19000 in weight average molecular weight. (The reaction mixture will be referred to as a "self-crosslinking resin solution D.")

The resin solution D was about 30% in solids content and 82% in gel fraction ratio (Note 1).

EXAMPLE 5

Isopropanol (40 parts) was placed into a reactor equipped with a stirrer, reflux condenser and thermometer, and was maintained at 70° C. with heating. A mixture of 37 parts of methyl methacrylate, 23 parts of n-butyl acrylate, 10 parts of styrene, 5 parts of ethyl methacrylate, 10 parts of 2-hydroxyethyl methacrylate, 15 parts of glycidyl methacrylate, 79.2 parts of the 70% polymer solution b-2 and 4 parts of 2,2'-azobis(2,4-dimethylvaleronitrile) was added dropwise to the isopropanol over a period of 3 hours. Subsequently, a mixture of 25 parts of butyl cellosolve and 0.5 part of 2,2'-azobis(2,4-dimethylvaleronitrile) was added dropwise to the resulting mixture over a period of 1 hour, followed by aging for 1 hour. With addition of 13 parts of diethylamine, the mixture was thereafter reacted at 80° C. for 1 hour for the introduction of tertiary amino group. After the completion of reaction, the reaction mixture was cooled to 40° C., and a mixture of 5.7 parts of acetic acid and 6.3 parts of isopropanol was added dropwise to the cooled mixture at the same temperature, followed by a further reaction for 1 hour. The resulting solution was substantially colorless and transparent, and was found to be 1 by a Hellige colorimeter. Deionized water (292.5 parts) was added to the solution to obtain an aqueous resin solution.

The resin obtained was 31.1 mg KOH/g resin in hydroxyl value, 24.5 g/1000 g resin in isocyanate value and about 21000 in weight average molecular weight. (The reaction mixture will be referred to as a "self-crosslinking resin solution E.")

The resin solution E was about 30% in solids content and 80% in gel fraction ratio (Note 1).

COMPARATIVE EXAMPLE 1

Xylene (35 parts) was placed into a reactor equipped with a stirrer, reflux condenser and thermometer, and was maintained at 90° C. with heating. A mixture of 20 parts of 2-isocyanate ethyl methacrylate blocked with methyl isobutyl ketoxime, 15 parts of styrene, 15 parts of 2-ethylhexyl methacrylate, 20 parts of n-butyl methacrylate, 15 parts of 2-hydroxyethyl acrylate, 15 parts of N,N-dimethylaminoethyl methacrylate and 1.5 parts of azobisisobutyronitrile was added dropwise to the xylene over a period of 3 hours. Subsequently, a mixture of 10 parts of butyl cellosolve and 0.5 part of azobisisobutyronitrile was added dropwise to the resulting mixture over a period of 1 hour, followed by aging for 1 hour, giving a comparative resin solution 1. This solution was a reddish brown liquid having a solids content of 67%. The copolymer was 29.1 mg/KOH resin in hydroxyl value and 22000 in weight average molecular weight. The solution was reddish brown and was found to be 8 by a Hellige colorimeter. The solution was neutralized with 5.5 parts of acetic acid and made into an aqueous solution with a solids content of 30% by adding deionized water thereto.

The comparative resin solution 1 was about 30% in solids content and 55% in gel fraction ratio (Note 1).

COMPARATIVE EXAMPLE 2

Xylene (35 parts) was placed into a reactor equipped with a stirrer, reflux condenser and thermometer, and was maintained at 90° C. with heating. A mixture of 15 parts of m-isopropenyl-α,α'-dimethylbenzyl isocyanate blocked with ethanol, 15 parts of methyl methacrylate, 15 parts of 2-hydroxyethyl methacrylate, 20 parts of 2-ethylhexyl methacrylate, 20 parts of n-butyl acrylate, 15 parts of N,N-dimethylaminoethyl methacrylate and 2 parts of α,α'-azobisisobutyronitrile was added dropwise to the xylene over a period of 3 hours. Subsequently, a mixture of 10 parts of butyl cellosolve and 0.5 part of azobisisobutyronitrile was added dropwise to the resulting mixture over a period of 1 hour, followed by aging for 1 hour. The resin solution obtained was a liquid colored yellow and having a solids content of 59%. The copolymer was 29 mg KOH/g resin in hydroxyl value and 20000 in weight average molecular weight. The solution was yellow and found to be 7 by Hellige colorimeter.

To the solution were added 5 parts of acetic acid and deionized water to prepare an aqueous solution, i.e., comparative resin solution 2, having a solids content of 30%.

The comparative resin solution 2 was about 30% in solids content and 57% in gel fraction ratio (Note 1).

COMPARATIVE EXAMPLE 3

Xylene (35 parts) was placed into a reactor equipped with a stirrer, reflux condenser and thermometer, and was maintained at 70° C. with heating. A mixture of 15 parts of m-isopropenyl-α,α'-dimethylbenzyl isocyanate, 15 parts of styrene, 15 parts of 2-hydroxyethyl acrylate, 35 parts of n-butyl methacrylate, 10 parts of 2-ethylhexyl methacrylate, 10 parts of N,N-dimethylaminoethyl methacrylate and 2.5 parts of α,α'-azobisisobutyronitrile was added dropwise to the xylene over a period of 3 hours in an attempt to prepare a polymer, whereas the mixture gelled 40 minutes after the start of the dropwise addition.

COMPARATIVE EXAMPLE 4

Xylene (35 parts) was placed into reactor equipped with a stirrer, reflux condenser and thermometer, and was maintained at 90° C. with heating. A mixture of 40 parts of equimolar adduct of isophorone diisocyanate/2-hydroxyethyl acrylate blocked with methyl ethyl ketoxime, 8 parts of styrene, 15 parts of 2-hydroxyethyl acrylate, 14 parts of n-butyl methacrylate, 10 parts of 2-ethylhexyl methacrylate, 13 parts of N,N-dimethylaminoethyl methacrylate and 2 parts of azobisisobutyronitrile was added dropwise to the xylene over a period of 3 hours. Subsequently, a mixture of 10 parts of butyl cellosolve and 0.5 part of azobisisobutyronitrile was added dropwise to the resulting mixture over a period of 1 hour, followed by aging for 1 hour. The resin solution obtained was a liquid having a solids content of 66% and colored yellowish brown. The solution was yellowish brown and was found to be 8 by a Hellige colorimeter. To the solution were added 4.2 parts of acetic acid and deionized water to prepare an aqueous solution, i.e., comparative resin solution 3, having a solids content of 30%.

The comparative resin solution 3 was about 30% in solids content and 55% in gel fraction ratio (Note 1).

EXAMPLE 6

Dibutyltin dilaurate was added to the self-crosslinking resin A in an amount of 1.0 part per 100 parts of the solids of the resin A.

EXAMPLE 7

Dibutyltin dilaurate was added to the self-crosslinking resin B in an amount of 0.5 part per 100 parts of the solids of the resin B.

EXAMPLE 8

Tin octylate was added to the self-crosslinking resin C in an amount of 1.0 part per 100 parts of the solids of the resin C.

EXAMPLE 9

Tin octylate was added to the self-crosslinking resin D in an amount of 1.0 part per 100 parts of the solids of the resin D.

EXAMPLE 10

Dibutyltin dilaurate was added to the self-crosslinking resin E in an amount of 1.0 part per 100 parts of the solids of the resin E.

COMPARATIVE EXAMPLE 5

Dibutyltin dilaurate was added to the comparative resin solution 1 in an amount of 1.0 part per parts of the resin solids.

COMPARATIVE EXAMPLE 6

Dibutyltin dilaurate was added to the comparative resin solution 2 in an amount of 1.0 part per 100 parts of the resin solids.

COMPARATIVE EXAMPLE 7

Dibutyltin dilaurate was added to the comparative resin solution 3 in an amount of 1.0 part per 100 parts of the resin solids.

Results of Property Tests

Coatings were prepared from the compositions of Examples 6 to 10 and Comparative Examples 5 to 7 by different methods and then tested for properties. Table 1 shows the results.

TABLE 1

| Example | 6 | | | 7 | | | 8 | | | 9 | | | 10 | | |
|---|---|---|---|---|---|---|---|---|---|---|---|---|---|---|---|
| Coating method | X | Y | Z | X | Y | Z | X | Y | Z | X | Y | Z | X | Y | Z |
| Appearance | Good | Good | Good | Good | Good | Good | Good | Good | Good | Good | Good | Good | Good | Good | Good |
| Gel fraction ratio | | | | | | | | | | | | | | | |
| 120° C./30 min | — | | | 96 | | | — | | | — | | | 95 | | |
| 140° C./30 min | 75 | | | 97 | | | 73 | | | 75 | | | 97 | | |
| 160° C./30 min | 96 | | | 98 | | | 97 | | | 95 | | | 94 | | |
| Yellowing | 0.7 | | | 0.8 | | | 0.6 | | | 0.8 | | | 0.7 | | |
| Gloss | | | | | | | | | | | | | | | |
| 120° C./30 min | 90 | 90 | 90 | 91 | 91 | 91 | 90 | 90 | 90 | 90 | 90 | 91 | 90 | 90 | 90 |
| 140° C./30 min | 91 | 90 | 90 | 92 | 93 | 92 | 90 | 91 | 91 | 91 | 90 | 91 | 91 | 92 | 91 |
| 160° C./30 min | 91 | 91 | 90 | 93 | 94 | 93 | 90 | 91 | 91 | 91 | 91 | 90 | 93 | 94 | 93 |
| Pencil hardness | | | | | | | | | | | | | | | |
| 120° C./30 min | HB | HB | HB | 2H | 2H | 2H | HB | HB | HB | HB | HB | HB | 2H | 2H | 2H |
| 140° C./30 min | HB | HB | HB | 2H | 2H | 2H | HB | HB | HB | HB | HB | HB | 2H | 2H | 2H |
| 160° C./30 min | 2H | 2H | 2H | 3H | 2H | 3H | 2H | 2H | 2H | 2H | 2H | 2H | 3H | 3H | 3H |

TABLE 1-continued

| | | | | | |
|---|---|---|---|---|---|
| Acid resistance | | | | | |
| 120° C./30 min | B B B | A A A | B B B | B B B | A A A |
| 140° C./30 min | B B B | A A A | B B B | B B B | A A A |
| 160° C./30 min | A A A | A A A | A A A | A A A | A A A |
| Solvent resistance | | | | | |
| 120° C./30 min | B B B | A A A | B B B | B B B | A A A |
| 140° C./30 min | B B B | A A A | B B B | B B B | A A A |
| 160° C./30 min | A A A | A A A | A A A | A A A | A A A |
| Water resistance | | | | | |
| 120° C./30 min | B B B | A A A | B B B | B B B | A A A |
| 140° C./30 min | B B B | A A A | B B B | B B B | A A A |
| 160° C./30 min | A A A | A A A | A A A | A A A | A A A |
| Gloss retentivity | | | | | |
| 120° C./30 min | 87 88 88 | 91 90 91 | 87 86 88 | 88 89 88 | 91 90 90 |
| 140° C./30 min | 90 91 89 | 92 91 93 | 91 88 90 | 91 90 90 | 93 91 92 |
| 160° C./30 min | 94 92 93 | 94 93 94 | 92 91 93 | 93 91 93 | 95 93 92 |
| Adhesion | | | | | |
| 120° C./30 min | A A A | A A A | A A A | A A A | A A A |
| 140° C./30 min | A A A | A A A | A A A | A A A | A A A |
| 160° C./30 min | A A A | A A A | A A A | A A A | A A A |

| Comparative Example | 4 | 5 | 6 |
|---|---|---|---|
| Coating method | X Y Z | X Y Z | X Y Z |
| Appearance | Reddish brown | Yellowish brown | Yellowish brown |
| Gel fraction ratio | | | |
| 140° C./30 min | 58 | 48 | 49 |
| 160° C./30 min | 90 | 82 | 89 |
| Yellowing | 3.8 | 2.4 | 3.3 |
| Gloss | 76 75 76 | 71 70 70 | 80 79 81 |
| 160° C./30 min | | | |
| Pencil hardness | | | |
| 140° C./30 min | 4B 4B 4B | 6B 6B 6B | 5B 5B 5B |
| 160° C./30 min | F F F | F F F | F F F |
| Acid resistance | | | |
| 140° C./30 min | C C C | C C C | C C C |
| 160° C./30 min | A A A | B B B | A A A |
| Solvent resistance | | | |
| 140° C./30 min | C C C | C C C | C C C |
| 160° C./30 min | A A A | B B B | A A A |
| Water resistance | | | |
| 140° C./30 min | C C C | C C C | C C C |
| 160° C./30 min | A A A | B B B | A A A |
| Gloss retentivity | 84 85 84 | 53 51 52 | 81 80 83 |
| 160° C./30 min | | | |
| Adhesion | B B B | B B B | B B B |
| 160° C./30 min | | | |

With reference to Table 1:

(1) Coating method

X: The composition was applied to a tinplate to such a thickness that the coating formed would be 20 μm thick on curing.

Y: A cold rolled steel (dull) panel treated with zinc phosphate was coated with a cationic electrophoretic epoxy coating composition to a thickness which would be 20 μm on curing. The coating was baked at 170° C. for 20 minutes, then polished over the surface with #400 sandpaper and thereafter wiped with gauze wetted with petroleum benzine for degreasing. An aminoalkyd intercoat composition for motor vehicles was further applied to the coating to a thickness of 30 μm when cured, baked at 140° C. for 30 minutes. The resulting coating was polished with #600 sandpaper with application of water, drained, dried and cleaned with petroleum benzine to obtain a substrate. The composition to be tested was applied by spray coating to the substrate to a thickness of 20 μm when cured.

Z: The composition was electrophoretically applied to a steel panel treated with zinc phosphate with application of a voltage of 250 V for 3 minutes at a bath temperature of 30° C.

(2) Appearance of coating;

The composition as applied was heated at 140° C. for 30 minutes to form a cured coating, which was checked with the unaided eye for surface smoothness, coloration, etc. The coating was evaluated as "good" when having high surface smoothness and free of coloration.

(3) Gel fraction ratio

The composition was applied to a tinplate to a thickness of 20 μm when dried, and then baked at 120° C. for 30 minutes, 140° C. for 30 minutes or 160° C. for 30 minutes. The coating prepared was separated off by the mercury amalgam method, placed into a container made of 300-mesh stainless steel net and subjected to extraction at the reflux temperature for 7 hours using a Soxhlet extractor and acetone/methanol (1:1) solvent. The gel fraction ratio was calculated from the following equation.

$$\text{Gel fraction ratio (\%)} = \frac{\text{Weight of coating after extraction}}{\text{Weight of coating before extraction}} \times 100$$

(4) Yellowing

The clear composition free of any coloring agent was applied to the surface of a cured coating formed from an amino resin/acrylic resin-based white thermosetting coating composition to a thickness of 20 μm when cured, and baked at 160° C. for 30 minutes for curing. On the other hand, the substrate itself was also baked at 160° C. for curing as a blank. Subsequently, the coating formed by the composition and the blank were checked for a color difference (Δb) therebetween as an index of yellowing.

(5) Gloss

The cured coating was checked for 60° specular reflectivity according to JIS K-5400.

(6) Pencil hardness

The cured coating was checked for pencil hardness according to JIS K-5400.

(7) Acid resistance

A 0.5 ml quantity of 40% sulfuric acid was applied dropwise to the cured coating, which was then dried at 60° C. for 15 minutes, thereafter washed with water and checked with the unaided eye.

A: No change, B: Slight blushing, C: Many blisters.

(8) Solvent resistance

The cured coating was rubbed with gauze wet with xylol reciprocally 20 times over a stroke length of 10 cm while pressing the gauze against the coating with a great force. The coating surface was thereafter checked. The result was evaluated according to the following criteria.

A: No change, B: Slight dulling, C: Marked dulling.

(9) Water resistance

A panel coated with the composition as cured was immersed in water at 40° C. for 240 hours, and the coating was thereafter checked. Evaluation criteria are as follows.

A: No change, B: Slight dulling, C: Dulling or blistering.

(10) Gloss retentivity

Determined by QUV accelerated weather test using an accelerated weathering tester, product of Q-Panel Company. The coating was irradiated with UV rays at 60° C. for 16 hours and then exposed to condensation water at 50° C. for 9 hours as one cycle, and subjected to this cycle 40 times (1000 hours). The coating was thereafter checked for 60° specular reflectivity for comparison with the corresponding value before weathering. The gloss retentivity was calculated from the following equation.

$$\text{Gloss retentivity (\%)} = \frac{\text{Reflectivity after weathering}}{\text{Reflectivity before weathering}} \times 100$$

(11) Adhesion

An adhesive tape was affixed to the coating formed with cross cuts (100 squares, 1 x 1 mm) and then forcibly peeled off. The number of remaining squares of coating was thereafter counted.

A: None separated (100 squares remained)
B: Some separated (up to 80 squares remained)

We claim:

1. A self-crosslinking vinyl resin comprising a graft polymer of (i) a first vinyl resin containing a blocked isocyanate group, and (ii) a second vinyl resin containing a hydroxyl group and a tertiary amino group and/or a quaternary ammonium group, said second vinyl resin being attached to said first vinyl resin by a urethane bond.

2. A self-crosslinking resin as defined in claim 1 which is a resin prepared from a vinyl polymer having at least two isocyanate groups in the molecule by reacting a hydroxyl-containing vinyl monomer with some of the isocyanate groups in the skeleton of the vinyl polymer to introduce a polymerizable double bond into the skeleton, then completely blocking the isocyanate groups remaining in the polymer skeleton with a blocking agent, and thereafter polymerizing an unsaturated monomer component consisting essentially of a hydroxyl-containing vinyl monomer and a vinyl monomer containing a tertiary amino group and/or a quaternary ammonium group with the introduced polymerizable double bond.

3. A self-crosslinking resin as defined in claim 1 which is a resin prepared from a vinyl polymer having at least two isocyanate groups in the molecule by blocking some of the isocyanate groups in the skeleton of the vinyl polymer with a blocking agent, then reacting a hydroxyl-containing vinyl monomer with the isocyanate groups remaining in the polymer skeleton to introduce a polymerizable double bond into the skeleton, and thereafter polymerizing an unsaturated monomer component consisting essentially of a hydroxyl-containing vinyl monomer and a vinyl monomer containing a tertiary amino group and/or a quaternary ammonium group with the introduced polymerizable double band.

4. A self-crosslinking resin as defined in claim 1 which is a resin prepared from a vinyl polymer having at least two isocyanate groups in the molecule by reacting a hydroxy-containing vinyl monomer with some of the isocyanate groups in the skeleton of the vinyl polymer to introduce a polymerizable double bond into the skeleton, then completely blocking the isocyanate groups remaining in the polymer skeleton with a blocking agent, thereafter polymerizing an unsaturated monomer component consisting essentially of a hydroxyl-containing vinyl monomer and a vinyl monomer containing a glycidyl group with the introduced polymerizable double bond, and subsequently reacting a secondary amine with the glycidyl group to introduce a tertiary amino group into the resulting polymer.

5. A self-crosslinking resin as defined in claim 1 which is a resin prepared from a vinyl polymer having at least two isocyanate groups in the molecule by blocking some of the isocyanate groups in the skeleton of the vinyl polymer with a blocking agent, then reacting a hydroxyl-containing vinyl monomer with the isocyanate groups remaining in the polymer skeleton to introduce a polymerizable double bond into the skeleton, thereafter polymerizing an unsaturated monomer component consisting essentially of a hydroxyl-containing vinyl monomer and a vinyl monomer containing a glycidyl group with the introduced polymerizable double bond, and subsequently reacting a secondary amine with the glycidyl group to introduce a tertiary amino group into the resulting polymer.

6. A self-crosslinking resin as defined in claim 1 which is about 1000 to about 100000 in weight average molecular weight.

7. A self-crosslinking resin as defined in claim 1 which is about 25 to about 250 mg KOH/g resin in hydroxyl value and about 15 to about 250 g/1000 g resin in isocyanate value.

8. An aqueous self-crosslinking resin characterized in that the resin is prepared from the self-crosslinking resin defined in claim 1 by dissolving or dispersing the resin in water or a mixture of water and a hydrophilic organic liquid after neutralizing the resin with an acid when required.

* * * * *